United States Patent
Lu et al.

(10) Patent No.: US 12,275,890 B2
(45) Date of Patent: Apr. 15, 2025

(54) METAL SULFIDE SCALE DISSOLVER FOR OILFIELD APPLICATION

(71) Applicant: Halliburton Energy Services, Inc., Houston, TX (US)

(72) Inventors: Alex Yi-Tsung Lu, Houston, TX (US); Zhiwei Yue, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/503,023

(22) Filed: Nov. 6, 2023

(65) Prior Publication Data

US 2025/0075120 A1 Mar. 6, 2025

Related U.S. Application Data

(63) Continuation-in-part of application No. 18/241,021, filed on Aug. 31, 2023.

(51) Int. Cl.
*E21B 37/06* (2006.01)
*C09K 8/532* (2006.01)

(52) U.S. Cl.
CPC ............. *C09K 8/532* (2013.01); *E21B 37/06* (2013.01)

(58) Field of Classification Search
None
See application file for complete search history.

(56) References Cited

U.S. PATENT DOCUMENTS

| | | |
|---|---|---|
| 6,926,836 B2 | 8/2005 | Fidoe et al. |
| 9,919,348 B2 | 3/2018 | Peng et al. |
| 10,113,102 B2 | 10/2018 | Peng et al. |
| 11,208,589 B2 | 12/2021 | Shen et al. |
| 11,421,143 B2 | 8/2022 | Mahmoud et al. |
| 11,560,774 B2 | 1/2023 | Chen et al. |
| 11,584,878 B1 | 2/2023 | Yue et al. |
| 11,584,879 B1 | 2/2023 | Mosina et al. |
| 2005/0067164 A1* | 3/2005 | Ke .............. C09K 8/528 166/308.2 |
| 2012/0168364 A1 | 7/2012 | Evans |
| 2017/0355895 A1* | 12/2017 | Peng ............ C09K 8/528 |
| 2018/0112124 A1 | 4/2018 | Conner et al. |
| 2018/0148632 A1 | 5/2018 | Bennett et al. |
| 2018/0347316 A1 | 12/2018 | Peng et al. |
| 2021/0207019 A1 | 7/2021 | Elkatatny et al. |
| 2021/0246354 A1 | 8/2021 | Rodgers et al. |
| 2021/0395123 A1 | 12/2021 | Labarre et al. |
| 2022/0056331 A1 | 2/2022 | Griffin |

(Continued)

OTHER PUBLICATIONS

International Search Report and Written Opinion for International Patent Application No. PCT/US2023/032759 dated May 22, 2024. PDF file. 7 pages.

(Continued)

*Primary Examiner* — Andrew Sue-Ako
(74) *Attorney, Agent, or Firm* — Thomas Rooney; C. Tumey Law Group PLLC

(57) ABSTRACT

A method may include providing a treatment fluid comprising a metal sulfide dissolver and a base fluid. The metal sulfide dissolver includes a chelating agent, a boosting agent, a scaling agent, and a dispersing agent. The treatment fluid is then injected to contact a metal sulfide scale, which dissolves at least partially. The treatment fluid may be injected into a wellbore as a standalone treatment or as an additive.

9 Claims, 2 Drawing Sheets

(56) References Cited

U.S. PATENT DOCUMENTS

2023/0133492 A1  5/2023  Mosina et al.
2023/0183554 A1  6/2023  Bennett et al.
2023/0193113 A1  6/2023  Mosina et al.

OTHER PUBLICATIONS

Solvay, Solvay Novecare Launches FeSOLV scale control technology to treat iron sulfide solids in oil and gas operations, 2015.
International Search Report and Written Opinion for International Patent Application No. PCT/US2024/043078 dated Dec. 12, 2024. PDF file. 8 pages.

* cited by examiner

METAL SULFIDE SCALE DISSOLVER FOR OILFIELD APPLICATION

CROSS-REFERENCE TO RELATED APPLICATION

This is a continuation-in-part of U.S. application Ser. No. 18/241,021, filed Aug. 31, 2023, the entire disclosure of which is incorporated herein by reference.

BACKGROUND

In the oilfield, scale deposits can represent a particular issue during various subterranean operations including drilling, casing, primary cementing, remedial cementing, hydraulic fracturing, gravel packing, frac-packing, solids control, wellbore and well remediation, swabbing, chemical injection, chemical flooding for enhanced oil recovery, steam injection, and production enhancement, among other wellbore operations. Scale can decrease the permeability of a subterranean formation, reduce well productivity, and shorten the lifetime of production equipment. Scale is a solid that precipitates out of solution or accumulates on the surface of subterranean materials, such as in fractures or subterranean flow pathways, or on equipment downhole, such as production tubing, gravel packing screens, or on equipment above the surface. Scale is a mineral or solid that is formed due to scale-forming ions that are present in water or petroleum downhole, such as $Fe^{2+}$, $Ca^{2+}$, $Mg^{2+}$, $Sr^{2+}$, and $Ba^{2+}$. Examples of scale include carbonate salts, sulfate salts, or sulfide salts, such as $CaCO_3$, $BaSO_4$, $SrSO_4$, $CaSO_4$, and FeS. Cleaning and removal of scale generally requires stopping production and is both time-consuming and costly. Scale control challenges are a leading cause of declining production worldwide. Scale costs the petroleum industry millions of dollars each year in scale control and removal costs, and in deferred production.

The deposition of iron sulfide scale inside production systems may be a persistent problem in the production of oil and gas. There is currently no generic solution for treating iron sulfide scale buildup. Iron sulfide scale may be a challenge to remove due to their tendency to reform in solution after treatment and existing treatments rarely achieve full removal. Current treatments may only remove up to about 60% of scale. The descaling of these iron sulfide may include two methods including mechanical removal and the chemical dissolution using mineral acids. Mechanical mitigation may be laborious and time inefficient. Chemical treatment, on the other hand, can be ineffective depending upon the form of the iron sulfide deposit. With current technology, different methods and mixtures of chemicals may be required depending upon the type of iron sulfide scale, and where along the pipeline or production tubing the scale is deposited.

Chemical treatment with mineral acids may also lead to metal corrosion and the production of toxic byproducts including hydrogen sulfide ($H_2S$). Treatment fluids including organic acids such as acetic, formic, and/or maleic acids with chelating agents have been developed to treat iron sulfide scale. However, organic acids may not be as effective in removing scale as mineral acids and may require a longer contact time for effective treatment.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
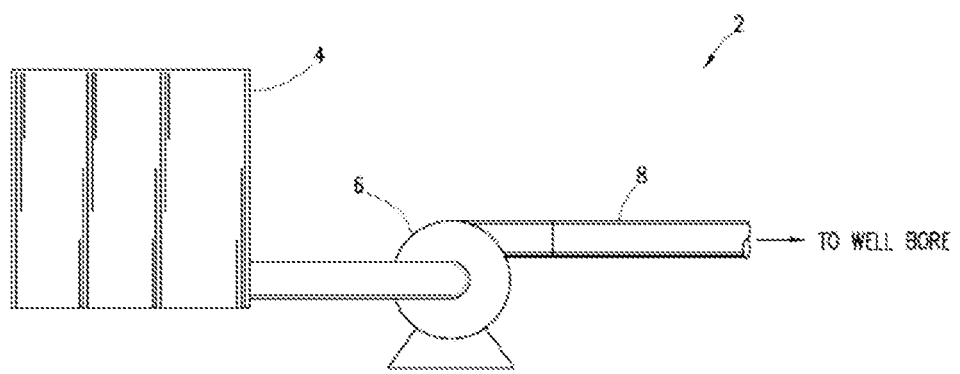
FIG. 1 is a schematic illustration of a fluid handling system for preparation and delivery of a treatment fluid comprising a metal sulfide dissolver into a wellbore according to an embodiment of the present disclosure.

The disclosure generally relates to metal containing scale removal. More specifically, the present disclosure may relate to compositions and methods of removing metal sulfide scale from equipment downhole, such as production tubing, gravel packing screens, and from equipment above the surface. The treatment fluid of one or more embodiments comprises a base fluid and a metal sulfide dissolver to remove metal sulfide scale in the production equipment downhole and above the surface. The treatment fluid can be injected on its own downhole in a wellbore or at surface in production equipment. Alternatively, the treatment fluid can be added as an additive to a stimulation fluid treatment, a fracturing fluid treatment, an acidizing fluid treatment, a corrosion inhibition treatment, a displacement fluid, a gravel packing treatment, or any other wellbore operations. The metal sulfide scale can be FeS, PbS, CaS, CuS, NiS, TiS, $Al_2S_3$, or any combination thereof, for example.

The base fluid may be any fluid suitable for use in a wellbore and capable of delivering the metal sulfide dissolver. Suitable base fluids include aqueous-based fluids, aqueous-miscible fluids, water-in-oil emulsions, oil-in-water emulsions, and any combination thereof. Suitable aqueous-based fluids include fresh water, saltwater (e.g., water containing one or more salts dissolved therein), brine (e.g., saturated salt water), seawater, produced water, wastewater, and any combination thereof. Suitable aqueous-miscible fluids include alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. In some examples, the aqueous base fluid has a pH between 3 and 12, alternatively the aqueous base fluid may have a pH in the range of about pH 4 to about pH 10 or about pH 5 to about pH 8 or about pH 6 to about pH 7 or about pH 6.8 to about pH 7.

The metal sulfide dissolver includes a chelating agent, a boosting agent, a scaling agent, and a dispersing agent. The metal sulfide dissolver may be present in an amount of about 0.01% to about 10% by weight of the treatment fluid, or from about 0.1% to about 1% by weight of the treatment fluid, or from about 0.05% to about 0.1% by weight of the treatment fluid. When the metal dissolver is used as an additive, the metal sulfide dissolver may be present in an amount of about 0.01% to about 10% by weight of the overall treatment fluid, or from about 0.1% to about 1% by weight of the overall treatment fluid, or from about 0.05% to about 0.1% by weight of the overall treatment fluid.

The chelating agent may be any suitable chelating agent which can complex with the disintegrated metal sulfide scales to facilitate removal. Suitable chelating agents include tetrakis (hydroxymethyl) phosphonium sulfate (THPS) and tetrakis (hydroxymethyl) phosphonium chloride ethylene diamine (THPC), salts thereof, and combinations thereof. The chelating agent may be present in an amount of about 0.01% to about 10% by weight of the treatment fluid, or about 0.025% to about 1% by weight of the treatment fluid, or about 0.04% to about 0.1% by weight of the treatment fluid.

The boosting agent may be any suitable boosting agent which can help the primary metal sulfide chelating agent complex with the disintegrated metal sulfide scales to facilitate removal. Suitable boosting agents include citric acid, ethylene diamine tetraacetic acid (EDTA), hydroxyethyl ethylene diamine tetraacetic acid (HEDTA), hydroxyethyl iminodiacetic acid (HIDA), glutamic acid N, N-diacetic acid (GLDA), diethylene triamine penta acetic acid (DTPA), nitrilotriacetic acid (NTA), methylglycinediacetic acid (MGDA), formic acid, acetic acid, oxalic acid, lactic acid, uric acid, malic acid, glycolic acid, tartaric acid, salts thereof, and combinations thereof, for example. The boosting agent may be present in an amount of about 0.01% to about 10% by weight of the treatment fluid, or about 0.025% to about 1% by weight of the treatment fluid, or about 0.04% to about 0.1% by weight of the treatment fluid, or about 0.04% to about 0.07% by weight of the treatment fluid.

The scaling agent may be any suitable scaling agent which can complex with the disintegrated metal sulfide scales, minimize the metal sulfide scale particle size and facilitate their removal, inhibit formation of carbonates, sulfates, phosphates, calcites, and barites, for example. Suitable scaling agents include any phosphonates, phosphonate derivatives such as diethylene triamine penta (methylene phosphonic acid) (DTPMP), polyphosphinocarboxylic acid (PPCA), amino trimethylene phosphonic acid (ATMP), 1-hydroxy ethane 1,1-diphosphonic acid (HEDP), amino tris(methylenephosphonic acid) (ATMP), ethylenediamine tetra(methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), bis(hexamethylene triamine penta (methylene phosphonic acid)) (BHMPTPMP), polyamino polyether methylene phosphonic acid (PAPEMP), aminoethylethanolamine phosphonate (AEEA), polyacrylic acid (PAA), polyepoxysuccinic acid (PESA), polyaspartic acid (PASP), phosphate esters, and polymers, salts thereof, and any combinations thereof. The scaling agent may be present in an amount of about 0.001% to about 10% by weight of the treatment fluid, or about 0.0025% to about 1% by weight of the treatment fluid, or about 0.003% to about 0.02% by weight of the treatment fluid.

The dispersing agent may be any dispersant which can help reduce the adhesion between particles and prevent flocculation or agglomeration. The dispersant may be any quaternary amine, poly- or non-poly cationic quaternary amine, such as polydiallyldimethylammonium chloride (polyDADMAC), poly(methacrylamido-4,4,8,8-tetramethyl-4,8-diaza-6-hydroxyl-nonamethylene dichloride) (PMDTHD), poly(vinylbenzyl trimethyl ammonium chloride) (PVBTMAC), polyethyleneimine (PEI), for example. Polyethyleneimine (PEI) is not ionic but includes nitrogen atoms that are nucleophilic and can interact strongly with iron ($Fe^{2+}$) ions and can inhibit formation of FeS. In some examples, polyethyleneimine can complex metal ions, such as Zn or Pb. Polyethyleneimine can be quaternized to form a polycationic polyammonium salt. Polyethyleneimine can have an average molecular weight ranging from about 1000 Daltons to about 5,000,000 Daltons. In some examples, the average molecular weight of polyethyleneimine may be about 60,000 Daltons. PMDTHD can have an average molecular weight ranging from about 1000 Daltons to about 5,000,000 Daltons. PVBTMAC can have an average molecular weight ranging from about 1000 Daltons to about 500,000 Daltons. PVBTMAC may be used as a homopolymer. In some examples, the average molecular weight of the homopolymer PVBTMAC may be about 400,000 Daltons. PDADMAC can have an average molecular weight ranging from about 1000 Daltons to about 500,000 Daltons. PDADMAC may be used as a homopolymer. In some examples, the average molecular weight of the homopolymer PDADMAC may be about 20,000 Daltons.

Quaternary ammonium cations are positively-charged polyatomic ions of the structure $[NR_4]^+$, where R is an alkyl group, an aryl group, or an organyl group. Quaternary ammonium cations are permanently charged, independent of the pH of their solution. Examples of quaternary ammonium cations include tetramethylammonium ion, tetraethylammonium ion, tetrapropylammonium ion, tetrabutylammonium ion, alkyltrimethyl ammonium (ATMAC), dialkyldimethyl ammonium (DADMAC), for example. The dispersing agent may be present in an amount of about 0.001% to about 1% by weight of the treatment fluid or about 0.001% to about 0.1% by weight of the treatment fluid or about 0.002% to about 0.05% by weight of the treatment fluid or about 0.002% to about 0.01% by weight of the treatment fluid.

The treatment fluid may also include any suitable additives that may serve a purpose other than delivery of the metal sulfide dissolver. Examples of suitable additives include a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a foaming agent, a gas, a pH control additive, a breaker, a biocide, a crosslinker, a stabilizer, a scale inhibitor, a gas hydrate inhibitor, a mutual solvent, an oxidizer, a reducer, a friction reducer, and any combination thereof.

In embodiments, the metal sulfide dissolver comprises tetrakis (hydroxymethyl) phosphonium sulfate (THPS) as chelating agent, citric acid as boosting agent, diethylene triamine penta (methylene phosphonic acid) (DTPMP) as scaling agent, and polydiallyldimethylammonium chloride (polyDADMAC) as dispersing agent. In other embodiments, tetrakis (hydroxymethyl) phosphonium sulfate (THPS) or tetrakis (hydroxymethyl) phosphonium chloride ethylene diamine (THPC) can be used with ethylene diamine tetraacetic acid EDTA as boosting agent, diethylene triamine penta (methylene phosphonic acid) (DTPMP) as scaling agent, and a dispersing agent, such as a quaternary amine, to achieve a synergy that enhances the performance of the metal sulfide dissolver. Therefore, several combinations of three components metal sulfide dissolver have been found to enhance its performance.

The treatment fluid may be used for removal of the metal sulfide scale in any suitable operation at any suitable stage of the wellbore's life, which include well drilling and production. In embodiments, the metal sulfide treatment can be an iron sulfide dissolver. The treatment fluid may be introduced into the wellbore and may remove any form of iron sulfide scale from any surface along the wellbore and associated processing equipment by making fluidic contact. The treatment fluid may then penetrate the pores of the iron sulfide scale structure and may disintegrate the iron sulfide scale. The chelating agent may then stabilize the disintegrated iron sulfide scales in the solution to facilitate removal from the wellbore.

The deposition of iron sulfide particles on the internal surfaces of a wellbore including pipelines and associated process equipment lead to scale buildup. Iron sulfide scales may be deposited in layers along a tubular such that a sample of scale may include several forms of iron sulfide within a section of scale. The disparate chemistry of the layers of iron sulfide may preclude dissolution of the iron sulfide scale by mineral acid alone, or organic acid alone, or chelating agent alone. Iron sulfide scale may exist in six different types and mixtures of said types which may include: purrhotite ($Fe_7S_8$), troilite (FeS), marcasite ($FeS_2$), pyrite ($FeS_2$), greigite ($Fe_2S_4$), and mackinawite ($Fe_9S_8$). Partially due to the sulfur, iron sulfide scales may be hydrophobic on their surfaces, and may be coated with oil in the oleaginous wellbore environment. The hydrophobic nature of iron sulfide scales may prevent dissolution of the scale by aqueous acids as the aqueous carrier may be prevented from contacting the scale. The dispersing agent may help in getting access to the iron sulfide scales to the chelating agent and the booster agent. Iron sulfide scales range from having a well-defined crystalline structure to amorphous species. Physical properties of the iron sulfide scale range from viscous gels to powders to fluffy crystals. Morphology of the iron sulfide scale may vary from needle-like structures to granular particles. The physical structure of the iron sulfide scale may be dependent upon the chemical identity of iron sulfide as well as the conditions which the iron sulfide formed, for example. Additional components of the iron sulfide scale may include heteroatoms such as carbon, oxygen, chlorine, calcium, and combinations thereof in varying weight percentages.

FIG. 1 is a schematic illustration of a fluid handling system 2 for preparation and delivery of a treatment fluid comprising a metal sulfide dissolver and a base fluid into a wellbore according to an embodiment of the present disclosure. The fluid handling system 2 may be used for preparing the metal sulfide dissolver and introducing it into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, which both may be fluidically coupled with a wellbore supply conduit 8. The fluid supply 4 may contain the treatment fluid comprising the metal sulfide dissolver. The pumping equipment 6 may be used to supply the treatment fluid comprising a metal sulfide dissolver and a base fluid from the fluid supply 4, which may include tank, reservoir, connections to external fluid supplies, and/or other suitable structures and equipment. While not illustrated, the fluid supply 4 may contain one or more components of the treatment fluid comprising a metal sulfide dissolver and a base fluid in separate tanks or other containers that may be mixed at any desired time. Pumping equipment 6 may be fluidically coupled with the wellbore supply conduit 8 to communicate the treatment fluid comprising a metal sulfide dissolver and a base fluid into wellbore. Fluid handling system 2 may also include surface and down-hole sensors (not shown) to measure pressure, rate, temperature and/or other parameters of the treatment fluid. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel deployed or may be comprised of sub-sea deployed equipment.

Figure 2:
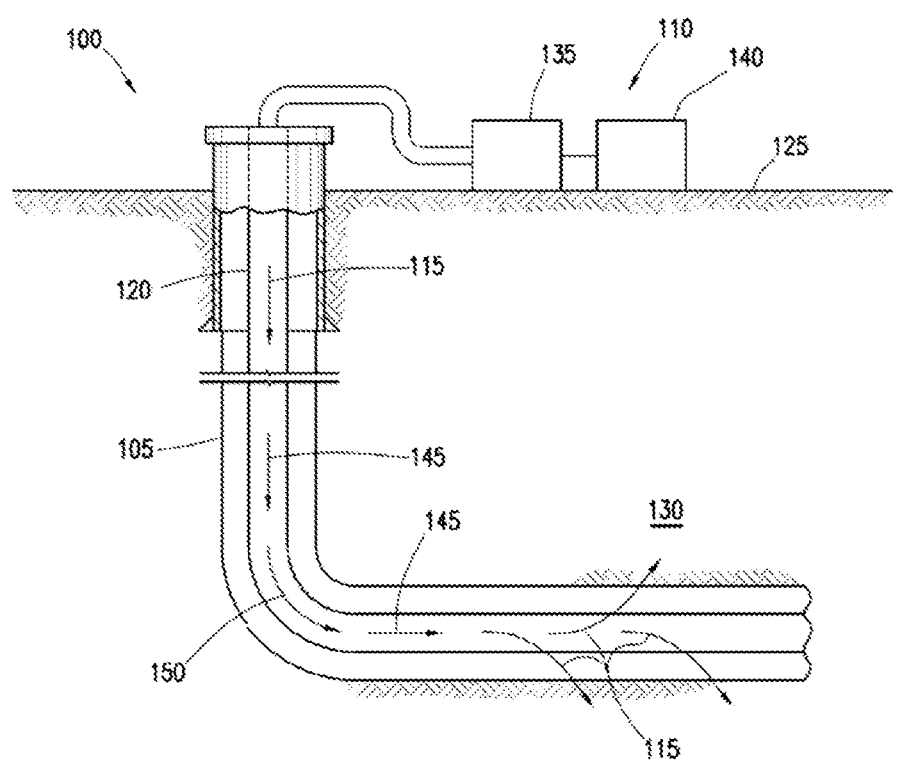
FIG. 2 is a schematic illustration of a well system for introduction of the treatment fluid comprising a metal sulfide dissolver into a wellbore according to an embodiment of the present disclosure.

Turning now to FIG. 2, an example well system 100 for introduction of an embodiment of the treatment fluid comprising a metal sulfide dissolver and a base fluid described herein into a wellbore 105 is shown. As depicted in FIG. 2, system 100 may include a fluid handling system 110 for introducing an embodiment of the treatment fluid 115 comprising a metal sulfide dissolver and a base fluid into the wellbore by way of tubular 120. One embodiment of the treatment fluid 115 may include any metal sulfide dissolver and additives disclosed herein in any desirable volume and concentration. In the illustrated embodiment, the fluid handling system 110 is above the surface 125 while wellbore 105 and tubular 120 are below the surface 125. The fluid handling system 110 can be configured in any suitable manner for the operation and may include additional or different features as appropriate. The fluid handling system 110 may be deployed via skid equipment, marine vessel, or may be comprised of sub-sea deployed equipment.

As illustrated in FIG. 2, wellbore 105 may include vertical and horizontal sections. Generally, a wellbore 105 may include horizontal, vertical, slant, curved, and other types of wellbore geometries and orientations. Wellbore 105 may include a casing that is cemented or otherwise secured to the wellbore wall. Wellbore 105 can be uncased or include uncased sections. Fluid handling system 110 may include mobile vehicles, immobile installations, skids, hoses, tubes, fluid tanks or reservoirs, pumps, valves, and/or other suitable structures and equipment. For example, the fluid handling system 110 may include pumping equipment 135 and a fluid supply 140, which both may be in fluid communication with the tubular 120. The fluid supply 140 may contain a treatment fluid 115 comprising a metal sulfide dissolver and a base fluid according to one or more embodiments. The pumping equipment 135 may be used to supply the treatment fluid 115 comprising a metal sulfide dissolver and a base fluid from the fluid supply 140, which may include tank, reservoir, connections to external fluid supplies, and/or other suitable structures and equipment. Pumping equipment 135 may be coupled to tubular 120 to communicate the treatment fluid 115 comprising a metal sulfide dissolver and a base fluid into wellbore 105. Fluid handling system 110 may also include surface and down-hole sensors (not shown) to measure pressure, rate, temperature and/or other parameters of the treatment. Fluid handling system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

Accordingly, the present disclosure may provide compositions and methods of removing metal sulfide scale from a wellbore, and particularly methods for removing metal scale deposits with a metal sulfide dissolver comprising a chelating agent, a boosting agent, a scaling agent, and a dissolving agent. The methods compositions/tools may include any of the various features disclosed herein, including one or more of the following statements.

Statement 1. A method comprising: providing a treatment fluid comprising: a metal sulfide dissolver comprising a chelating agent, a boosting agent, a scaling agent, and a dispersing agent; and a base fluid; contacting a metal sulfide scale with the treatment fluid; and dissolving at least a portion of the metal sulfide scale with the treatment fluid.

Statement 2. The method of Statement 1, wherein the chelating agent comprises at least one chelating agent selected from the group consisting of tetrakis (hydroxymethyl) phosphonium sulfate (THPS), tetrakis (hydroxymethyl) phosphonium chloride ethylene diamine (THPC), salts thereof, and combinations thereof.

Statement 3. The method of Statement 1 or Statement 2, wherein the boosting agent comprises at least one boosting agent selected from the group consisting of citric acid, ethylene diamine tetraacetic acid (EDTA), hydroxyethyl ethylene diamine tetraacetic acid (HEDTA), hydroxyethyl iminodiacetic acid (HIDA), glutamic acid N, N-diacetic acid (GLDA), diethylene triamine penta acetic acid (DTPA), nitrilotriacetic acid (NTA), methylglycinediacetic acid (MGDA), formic acid, acetic acid, oxalic acid, lactic acid, uric acid, malic acid, tartaric acid, and combination thereof.

Statement 4. The method of any one of the previous Statements, wherein the scaling agent comprises at least one scaling agent selected from the group consisting of diethylene triamine penta (methylene phosphonic acid) (DTPMP), polyphosphinocarboxylic acid (PPCA), amino trimethylene phosphonic acid (ATMP), 1-hydroxy ethane 1,1-diphosphonic acid (HEDP), amino tris(methylenephosphonic acid) (ATMP), ethylenediamine tetra(methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), bis(hexamethylene triamine penta (methylene phosphonic acid)) (BHMPTPMP), polyamino polyether methylene phosphonic acid (PAPEMP), aminoethylethanolamine phosphonate (AEEA), polyacrylic acid (PAA), polyepoxysuccinic acid (PESA), polyaspartic acid (PASP).

Statement 5: The method of any one of the previous Statements, wherein the dispersing agent comprises at least one dispersing agent selected from the group consisting of polydiallyldimethylammonium chloride (polyDADMAC), poly(methacrylamido-4,4,8,8-tetramethyl-4,8-diaza-6-hydroxyl-nonamethylene dichloride) (PMDTHD), poly(vinylbenzyl trimethyl ammonium chloride) (PVBTMAC), and polyethyleneimine (PEI).

Statement 6: The method of any one of the previous Statements, wherein the chelating agent is present in an amount of about 0.04 wt % to about 0.1 wt % by weight of the treatment fluid.

Statement 7: The method of any one of the previous Statements, wherein the boosting agent is present in an amount of about 0.04 wt % to about 0.07 wt % by weight of the treatment fluid.

Statement 8: The method of any one of the previous Statements, wherein the scaling agent is present in an amount of about 0.003 wt % to about 0.02 wt % by weight of the treatment fluid.

Statement 9: The method of any one of the previous Statements, wherein the dispersing agent is present in an amount of about 40 ppm to about 200 ppm by weight of the treatment fluid.

Statement 10: A method comprising: preparing a treatment fluid comprising: a metal sulfide dissolver comprising a chelating agent, a boosting agent, a scaling agent, and polydiallyldimethylammonium chloride (polyDADMAC); and a base fluid; introducing the treatment fluid into a wellbore; and contacting scale with the treatment fluid to dissolve at least a portion of the scale.

Statement 11: The method of Statement 10, wherein the chelating agent comprises at least one chelating agent selected from the group consisting of tetrakis (hydroxymethyl) phosphonium sulfate (THPS), tetrakis (hydroxymethyl) phosphonium chloride ethylene diamine (THPC), salts thereof, and combinations thereof.

Statement 12. The method of Statement 10 or Statement 11, wherein the boosting agent comprises at least one boosting agent selected from the group consisting of citric acid, ethylene diamine tetraacetic acid (EDTA), hydroxyethyl ethylene diamine tetraacetic acid (HEDTA), hydroxyethyl iminodiacetic acid (HIDA), glutamic acid N, N-diacetic acid (GLDA), diethylene triamine penta acetic acid (DTPA), nitrilotriacetic acid (NTA), methylglycinediacetic acid (MGDA), formic acid, acetic acid, oxalic acid, lactic acid, uric acid, malic acid, tartaric acid, and combination thereof.

Statement 13. The method of any one of Statements 10-12, wherein the scaling agent comprises at least one scaling agent selected from the group consisting of diethylene triamine penta (methylene phosphonic acid) (DTPMP), polyphosphinocarboxylic acid (PPCA), amino trimethylene phosphonic acid (ATMP), 1-hydroxy ethane 1,1-diphosphonic acid (HEDP), amino tris(methylenephosphonic acid) (ATMP), ethylenediamine tetra(methylene phosphonic acid) (EDTMP), tetramethylenediamine tetra(methylene phosphonic acid) (TDTMP), hexamethylenediamine tetra(methylene phosphonic acid) (HDTMP), ethylene diamine tetra (methylene phosphonic acid) (EDTMPA), bis(hexamethylene triamine penta (methylene phosphonic acid)) (BHMPTPMP), polyamino polyether methylene phosphonic acid (PAPEMP), aminoethylethanolamine phosphonate (AEEA), polyacrylic acid (PAA), polyepoxysuccinic acid (PESA), polyaspartic acid (PASP).

Statement 14. The method of any one of Statements 10-13, wherein polydiallyldimethylammonium chloride (polyDADMAC) is present in an amount of about 40 ppm to about 200 ppm by weight of the treatment fluid.

Statement 15. The method of any one of of Statements 10-14, wherein the chelating agent is present in an amount of about 0.04 wt % to about 0.1 wt % by weight of the treatment fluid.

Statement 16. The method of any one of Statements 10-15, wherein the boosting agent is present in an amount of about 0.04 wt % to about 0.1 wt % by weight of the treatment fluid.

Statement 17. The method of any one of Statements 10-16, wherein the chelating agent is tetrakis (hydroxymethyl) phosphonium sulfate (THPS), the boosting agent is ethylene diamine tetraacetic acid (EDTA), and the base fluid comprises an aqueous fluid with a pH of about 6.8 to about 7.

Statement 18. The method of any one of Statements 10-17, wherein the boosting agent comprises at least one boosting agent selected from the group consisting of citric acid, ethylene diamine tetraacetic acid (EDTA), and any combination thereof.

Statement 19. The method of any one of Statements 10-18, wherein the scaling agent is diethylene triamine penta (methylene phosphonic acid) (DTPMP), and polyphosphinocarboxylic acid (PPCA).

Statement 20. A treatment fluid comprising: an iron sulfide dissolver comprising tetrakis (hydroxymethyl) phosphonium sulfate (THPS), citric acid, diethylene triamine penta (methylene phosphonic acid) (DTPMP), and polydiallyldimethylammonium chloride (polyDADMAC); and a base fluid comprising an aqueous fluid with a pH of about 6 to about 7.

To facilitate a better understanding of the present invention, the following examples of certain aspects of some embodiments are given. In no way should the following examples be read to limit, or define, the entire scope of the disclosure.

Examples

Experiments were designed to evaluate the performance of some embodiments of the treatment fluid comprising a base fluid and a metal sulfide dissolver including a chelating agent, a boosting agent, a scaling agent, and a dispersing agent. The sealed bottles (5 per batch) were filled with the different formulation of brine in Table 1 as follows:

TABLE 1

Field Representative Brine Tested.

| Species | Field representative brine for testing (ppm) |
| --- | --- |
| $Na^+$ | 41,520 |
| $K^+$ | 610 |
| $Mg^{2+}$ | 640 |
| $Ca^{2+}$ | 3290 |
| $Sr^{2+}$ | 410 |
| $HCO_3^-$ | 260* |
| $SO_4^{2-}$ | 450 |
| $Cl^-$ | 72,100 |
| PIPES (buffer) | 2,000** |
| pH | 6.8-7.0 |

*bicarbonate is omitted to prevent calcium carbonate formation.
**PIPES is added as the buffer for pH control.

100 mL brine solution was purged with bubbling nitrogen to eliminate oxygen from the brine. Then, pH neutralized dissolver chemicals were added to the brine. Next, a concentrated sodium sulfide solution was added to the solution to create 6 ppm sulfide in brine, then concentrated iron chloride solution was inserted into the brine solution to create 40 ppm iron in brine. Finally, 40 ppm iron/6 ppm sulfide were dissolved in a solution containing 300 ppm of THPS, 200 ppm of citric acid, 50 ppm of DTPMP and 50 ppm of polyDADMAC in a base fluid. The pH of the resulting solution was in between about 6.8 and about 7.0. The bottles were then sealed and aged at 80° F. (or ambient temperature) and maintained at 80° F. for four hours. After 4 hours, the solution was filtered through a 0.45 filtration pore size before analysis by Inductively Coupled Plasma Optical Emission Spectroscopy (ICP-OES) measurements. Three types of formulation were tested: the chelating agent alone, the chelating agent combined with the boosting agent, and the chelating agent combined with the boosting agent and the dispersant agent of one embodiment of the present disclosure.

300 ppm of tetrakis (hydroxymethyl) phosphonium sulfate (THPS) was selected as chelating agent and was first tested alone. The THPS alone shows a 38% dissolution of the iron scale.

When 300 ppm THPS was combined with 200 ppm citric acid as boosting agent, the dissolution of the iron scale was enhanced to 40%.

When 300 ppm THPS was combined with 200 ppm citric acid as boosting agent and 50 ppm DTPMP as scaling agent, the dissolution of the iron scale was enhanced to 67%.

Finally, when 300 ppm THPS was combined with 200 ppm citric acid as boosting agent, 50 ppm DTPMP as scaling agent and 50 ppm polydiallyldimethylammonium chloride (polyDADMAC) as dispersing agent, the dissolution of the iron scale was enhanced to 97%. Therefore, the same concentration of THPS in the 4-component iron sulfide dissolver leads to a dissolving efficiency almost 2.5 times as high as THPS alone or THPS combined with citric acid with the same concentration.

Further, the concentration of DTPMP is important. If the concentration of DTPMP was 10 ppm, the dissolution was just 41%. If the concentration of DTPMP was 20 ppm, the dissolution was just 43%. However, if the concentration of DTPMP was 30 ppm, the dissolution was enhanced to 64%. If the concentration of DTPMP was 50 ppm, the dissolution was enhanced to 67%. On top of that (300 ppm THPS, 200 ppm citric acid and 50 ppm DTPMP), the concentration of polyDADMAC is important as well. If the concentration of polyDADMAC was 10 ppm, the dissolution was just 67%. If the concentration of polyDADMAC was 30 ppm, the dissolution was just 70%. However, if the concentration of polyDADMAC was 40 ppm, the dissolution was enhanced to 84%. If the concentration of polyDADMAC was 50 ppm, the dissolution was enhanced to 97%. If the concentration of polyDADMAC was 100 ppm, the dissolution was enhanced to 97%.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:
1. A method comprising:
providing a treatment fluid comprising:

a metal sulfide dissolver comprising a chelating agent, a boosting agent, a scaling agent, and a dispersing agent,
  wherein the chelating agent comprises tetrakis (hydroxymethyl) phosphonium sulfate (THPS), salts thereof, or combinations thereof in an amount of about 0.03 wt % to about 0.1 wt % by weight of the treatment fluid;
  wherein the boosting agent comprises citric acid in an amount of about 0.02 wt % to about 0.07 wt % by weight of the treatment fluid;
  wherein the scaling agent comprises diethylene triamine penta (methylene phosphonic acid) (DTPMP) in an amount of about 0.003 wt % to about 0.02 wt % by weight of the treatment fluid;
  wherein the dispersing agent comprises polydiallyldimethylammonium chloride (polyDADMAC) in an amount of about 25 ppm to about 200 ppm by weight of the treatment fluid; and
a base fluid;
contacting a metal sulfide scale with the treatment fluid; and
dissolving from 67% to 97% of the metal sulfide scale with the treatment fluid.

2. The method of claim 1, wherein the tetrakis (hydroxymethyl) phosphonium sulfate (THPS) is present in an amount of about 0.04 wt % to about 0.1 wt % by weight of the treatment fluid.

3. The method of claim 1, wherein the citric acid is present in an amount of about 0.04 wt % to about 0.07 wt % by weight of the treatment fluid.

4. The method of claim 1, wherein the polydiallylammonium chloride (polyDADMAC) is present in an amount of about 40 ppm to about 200 ppm by weight of the treatment fluid.

5. A method comprising:
preparing a treatment fluid comprising:
  a metal sulfide dissolver comprising a chelating agent, a boosting agent, a scaling agent, and polydiallyldimethylammonium chloride (polyDADMAC),
    wherein the chelating agent comprises tetrakis (hydroxymethyl) phosphonium sulfate (THPS), salts thereof, or combinations thereof in an amount of about 0.03 wt % to about 0.1 wt % by weight of the treatment fluid;
    wherein the boosting agent comprises citric acid in an amount of about 0.02 wt % to about 0.07 wt % by weight of the treatment fluid;
    wherein the scaling agent comprises diethylene triamine penta (methylene phosphonic acid) (DTPMP) in an amount of about 0.003 wt % to about 0.02 wt % by weight of the treatment fluid;
  wherein the polydiallyldimethylammonium chloride (polyDADMAC) in present in an amount of about 25 ppm to about 200 ppm by weight of the treatment fluid; and
  a base fluid;
introducing the treatment fluid into a wellbore; and
contacting sulfide scale with the treatment fluid to dissolve from 67% to 97% of the sulfide scale.

6. The method of claim 5, wherein polydiallyldimethylammonium chloride (polyDADMAC) is present in an amount of about 40 ppm to about 200 ppm by weight of the treatment fluid.

7. The method of claim 5, wherein the tetrakis (hydroxymethyl) phosphonium sulfate (THPS) is present in an amount of about 0.04 wt % to about 0.1 wt % by weight of the treatment fluid.

8. The method of claim 5, wherein the citric acid is present in an amount of about 0.04 wt % to about 0.1 wt % by weight of the treatment fluid.

9. The method of claim 5, wherein the base fluid comprises an aqueous fluid with a pH of about 6.8 to about 7.

* * * * *